United States Patent
Wang

(10) Patent No.: US 8,602,251 B2
(45) Date of Patent: Dec. 10, 2013

(54) WALL STRUCTURE OF LARGE-SIZED REFRIGERATED STORAGE AND CONSTRUCTION METHOD THEREOF

(75) Inventor: Hong Wang, Guangzhou (CN)

(73) Assignee: Guangzhou Baier Cold-Chain Polyurethane Technology Co., Ltd. (CN)

( * ) Notice: Subject to any disclaimer, the term of this patent is extended or adjusted under 35 U.S.C. 154(b) by 143 days.

(21) Appl. No.: 13/262,242

(22) PCT Filed: Mar. 30, 2010

(86) PCT No.: PCT/CN2010/071436
§ 371 (c)(1),
(2), (4) Date: Sep. 30, 2011

(87) PCT Pub. No.: WO2010/111945
PCT Pub. Date: Oct. 7, 2010

(65) Prior Publication Data
US 2012/0031912 A1    Feb. 9, 2012

(30) Foreign Application Priority Data
Apr. 3, 2009    (CN) .......................... 2009 1 0038383

(51) Int. Cl.
*F25D 23/06*    (2006.01)
(52) U.S. Cl.
USPC ............ 220/592.07; 220/592.02; 220/592.05; 220/592.09; 220/592.1; 220/592.06

(58) Field of Classification Search
USPC ............ 220/592.02, 592.05, 592.06, 592.07, 220/592.09, 592.1, 1.5
See application file for complete search history.

(56) References Cited

U.S. PATENT DOCUMENTS

| | | | | |
|---|---|---|---|---|
| 4,279,112 A * | 7/1981 | Bertrand | ...................... | 52/741.4 |
| 5,934,741 A * | 8/1999 | Beukers et al. | ............ | 296/181.6 |
| 6,098,744 A * | 8/2000 | Kawamura | ...................... | 181/198 |
| 7,584,863 B2 * | 9/2009 | Bucher et al. | .................. | 220/1.5 |
| 2006/0006174 A1 * | 1/2006 | Bucher et al. | .................. | 220/1.5 |

\* cited by examiner

*Primary Examiner* — Stephen Castellano
(74) *Attorney, Agent, or Firm* — Lerner, David, Littenberg, Krumholz & Mentlik, LLP

(57) ABSTRACT

A wall structure of a large-sized refrigerated storage and a construction method thereof are provided. The wall structure comprises an interior wall board (1), an exterior wall board (2) and a skeleton positioned between the interior wall board (1) and the exterior wall board (2). A polyurethane foam plastic (7) is filled between the interior wall board (1) and he exterior wall board (2). The method for construction a wall of a large-sized refrigerated storage comprises the following steps: A. building the wall skeleton; B. mounting a color steel plate on the outer surface of the skeleton to form an exterior wall board (2) of the wall; C. painting the polyurethane spraying material on the exterior wall board (2) layer by layer for multiple times, and reserving a pouring apace at a distance of 40 to 80 mm from the installation position of a interior wall board (1); and D. taking the color steel plate of the interior wall as a mold plate and pouring space at the color steel plate of the interior wall to form the interior wall board (1) of the wall. The wall structure is simple and the structural strength of light steel is high.

5 Claims, 3 Drawing Sheets

WALL STRUCTURE OF LARGE-SIZED REFRIGERATED STORAGE AND CONSTRUCTION METHOD THEREOF

This application is the national stage entry (PCT Rule 371) of PCT CN2010/071436 filed Mar. 30, 2010.

FIELD OF THE INVENTION

The present invention relates to building structure and construction, and more particularly, to a wall structure of a large-sized refrigerated storage and a construction method thereof.

BACKGROUND OF THE INVENTION

Currently, the wall construction of large-sized refrigerated storage can be divided into three types: the first kind is a refrigerated storage of Reinforced Concrete Frame Structure by applying the insulation to the outside and/or the inside of the reinforced concrete frame being erected; the second kind is a combined refrigerated storage constructed by jointing connection of combination library boards; the third kind is a refrigerated storage of steel frame structure by applying the insulation to the outside and/or the inside of the steel frame of the wall construction of refrigerated storage being erected by steel totally.

Though the first type of the refrigerated storage aforementioned has a good sealing and thermal insulation, it takes a long construction period, and thus cost too much and is not flexible enough; the second type of the refrigerated storage takes a short construction period, but it is easy to produce a crack on the joint of the library boards in a long-term process of temperature variation, and this "cold running" problem is particularly serious in a large-sized refrigerated storage with vast proportions; in order to construct this refrigerated storage with a steel frame structure e of the third type aforementioned, it is the most important to dealt with the problem of the broken cold-bridge components inside and/or outside the wall structure and make sure of the Integration and the sealing of the insulation.

Hence, it is desired to provide an improved wall structure of a refrigerated storage by applying a construction method of the wall insulation to the wall structure to solve the above-mentioned problems and achieve a good performance.

SUMMARY OF THE INVENTION

Accordingly, an object of the present invention is to provide a wall structure of a large-sized refrigerated storage which is capable of providing strong sealing and insulation, having a structure of high strength and beautiful generous, and being nice to meet food hygiene requirements.

Another object of the present invention is to provide a method of construction wall of a large-sized refrigerated storage to shorten the construction period to be equivalent to the construction period of combined refrigerated storage.

To achieve the above-mentioned objects, the wall structure of a large-sized refrigerated storage comprises an interior wall board, an exterior wall board and a skeleton positioned between the interior wall board and the exterior wall board, a space formed between the interior wall board and the exterior wall board being filled with a polyurethane foam plastic; the skeleton which being constructed by vertical fixed steel columns and lateral fixed light steels having broken cold-bridge components fixed therein, each of said broken cold-bridge components having two ends being soldered to the light steels on both side of the skeleton respectively.

Preferably, the vertical fixed steel columns of the skeleton are situated at the exterior wall board or a high-temperature side in line, and the lateral fixed light steels of the skeleton are situated at the interior wall board as well as at the exterior wall board in parallel.

Preferably, each of said broken cold-bridge components is mainly consist of a solid cylindrical insulation rod being made of high impaction PP (polyethylene propylene as the main component) and two screws, each of said screws having one end thereof connecting to either end of the insulation rod and the other end thereof being soldered to the skeleton.

Preferably, the insulation rods positioned on the same level are perpendicular to the interior wall board and the exterior wall board, and a distance between the adjacent insulation rods ranges from 500 mm to 1000 mm. A reasonable distribution of the insulation rods is capable of strengthening the whole skeleton and ensuring the well-rounded broken cold-bridge of the wall.

Preferably, the interior wall board is a color steel plate, a stainless steel plate or a sandwich panel and the exterior wall board wall is a color steel plate, a stainless steel plate, a aluminum plate or a sandwich panel; the steel columns are C-shaped steels or channel steel columns and the light steels are angle steels or C-shaped steels, and a distance between the adjacent steel columns ranges from 2000 mm to 4000 mm. The wall of the refrigerated storage which resorts to a double-faced color steel plate, a stainless steel plate or a aluminum plate for the mounting to improve the characteristics of fire prevention and collision avoidance, is safe and reliable, beautiful generous, and nice to meet food hygiene requirements; the structure of the C-shaped steels or channel steel columns is strength enough to avoid the "cold running" problem produced by stress concentration of joints of the library boards in the process of installation, thus increase the age of the storage.

A method of construction wall of a large-sized refrigerated storage, comprising the steps of:

A. building the wall skeleton, each skeleton of the wall of the refrigerated storage being connected reciprocally, so as to forming an overall framework;

B. mounting a color steel plate, a stainless steel plate, a aluminum plate or a sandwich panel on the outer surface of the skeleton to form an exterior wall board of the wall of the refrigerated storage by assembling the stainless steel plate, the aluminum plate or the sandwich panel;

C. painting the exterior wall board with a polyurethane spraying material layer by layer for multiple times, and reserving a pouring apace at a distance of 40 to 80 mm from the installation position of a interior wall board; and D. mounting a color steel plate, a stainless steel plate or a sandwich panel of the interior wall board in order by taking a color steel plate, a stainless steel plate or a sandwich panel of the interior wall as a mould plate and pouring a polyurethane spraying material into the pouring space at the color steel plate, the stainless steel plate or the sandwich panel of the interior wall and then mounting another color steel plate, another stainless steel plate or another sandwich panel of the interior wall board after the solidification of the polyurethane spraying material and then pouring a polyurethane spraying material again to form a interior wall board of the wall of the refrigerated storage.

The construction method is simple, and takes a short construction period; with the special construction method, the interior wall which makes a color steel plate, a stainless steel plate, a sandwich panel and a foam into a unit by pouring and mounting a color steel plate, a stainless steel plate or a sandwich panel is solid and practical, and it has no gap between the color steel plate, the stainless steel plate and the foam, so as to protect the foam best for effectively preventing the escape of foaming agent and maintaining thermal conductivity at a stable level; the entirety, sealing and collision avoidance of the wall are good, and the age of polyurethane foam is prolonged.

Preferably, the step A further comprises steps of: building the skeleton with C-shaped steel columns and angle steels by providing a line of C-shaped steel columns situated at the exterior wall board or a high-temperature side, the distance between the adjacent steel columns being ranged from 2000 mm to 4000 mm; and providing a plurality of lateral fixed angle steels on the C-shaped steel columns being up, each broken cold-bridge component having one end thereof being soldered to the angle steel situated at the exterior wall board and the other end thereof being soldered to the angle steel situated at the interior wall board.

Preferably, the distance between the adjacent insulation rods of broken cold-bridge component positioned on the same level ranges from 500 mm to 1000 mm.

Preferably, the color steel plate, the stainless steel plate or the aluminum plate of the exterior wall board and the color steel plate, the stainless steel plate or the sandwich panel of the interior wall board are fixed to the angle steels of the skeleton by self-tapping screws or sealed type blind rivets in steps B and C.

Preferably, the spraying method of layer by layer for multiple times in step C comprises steps of:

taking the color steel plate, the stainless steel plate or the sandwich panel of the interior wall with a thickness of the polyurethane spraying material being 10 to 15 mm as a mould plate for the first time of spraying;

forming a thickness of the polyurethane spraying material being 15 mm to 25 mm for the second time of spraying;

forming a thickness of the polyurethane spraying material being 25 mm to 35 mm for the third time of spraying, and taking the thickness as the model for each spraying after that until producing a distance of 40 mm to 80 mm from the interior wall board; and each interval between two sprayings being more than 5 minutes.

Compared with the prior art, the wall structure of a large-sized refrigerated storage for the lapping plate according to the present invention brings a lot of following advantageous effects:

(1) the quick spraying construction method of a refrigerated storage applied to a light steel structure is capable of providing a better insulation performance and saving energy 10% in comparison with the combined storage;

(2) the method of construction wall of a refrigerated storage is quick and efficient that the construction period it takes is only one half of that of the civil storage and equal to that of the combined storage;

(3) the wall and the refrigerated storage which resorts to a double-faced color steel plate, a stainless steel plate or a aluminum plate for the mounting to improve the characteristics of fire prevention and collision avoidance, is safe and reliable, beautiful generous, and nice to meet food hygiene requirements;

(4) the wall has a lot of characteristics such as entirety, seamless and good insulation which are equal to those of a civil storage;

(5) the structure of light steel is strength enough to avoid the "cold running" problem produced by stress concentration of joints of the library boards, thus prolong the age of the storage.

DETAILED DESCRIPTION OF ILLUSTRATED EMBODIMENTS

Figure 1:
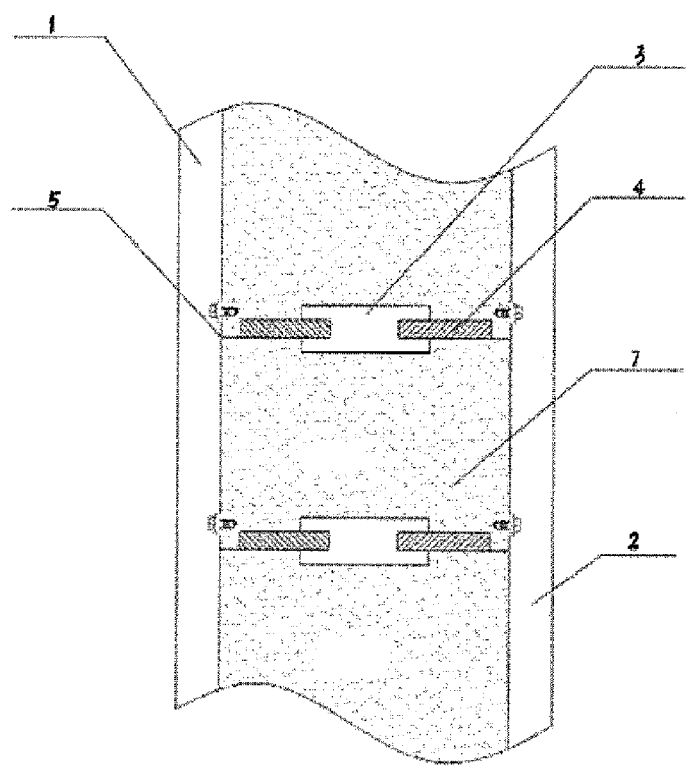
FIG. 1 is a longitudinal sectional view of a wall structure of a large-sized refrigerated storage according to the present invention.

Various preferred embodiments of the invention will now be described with reference to the figures, wherein like reference numerals designate similar parts throughout the various views.

Figure 2:
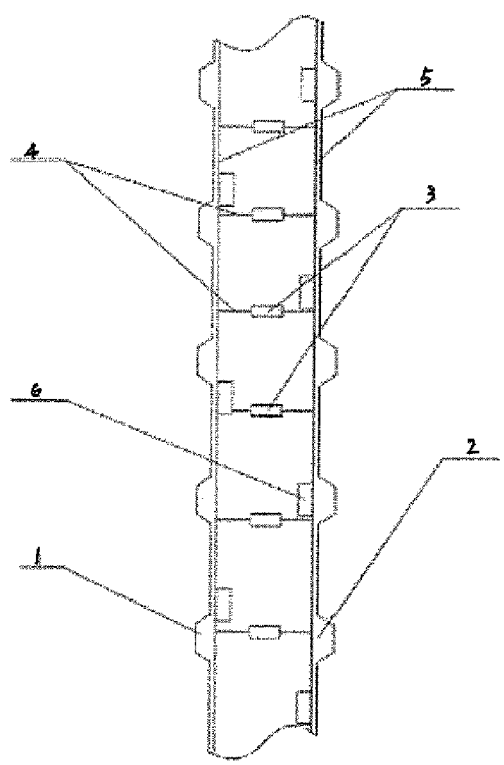
FIG. 2 is a top plan view of a wall structure of a large-sized refrigerated storage according to the present invention.
Figure 3:
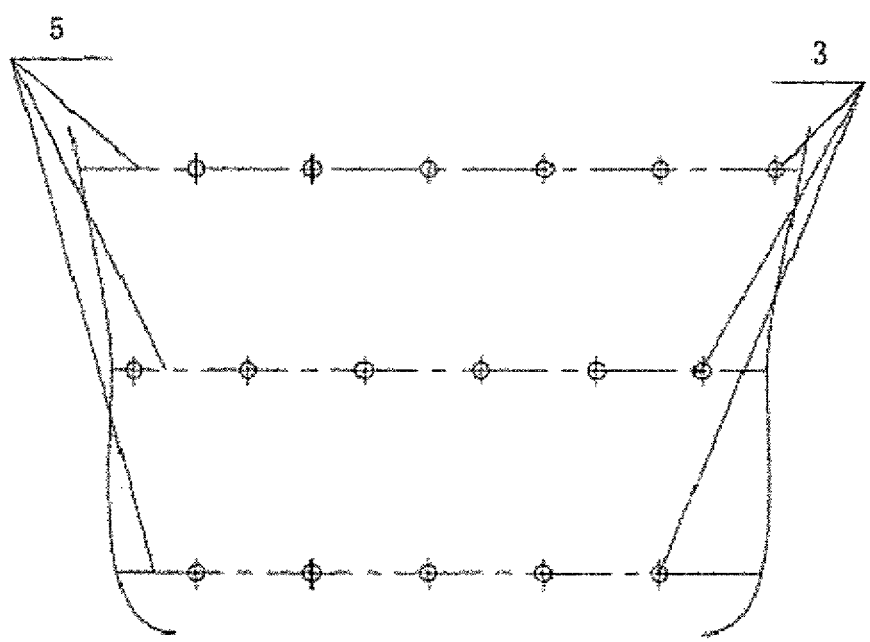
FIG. 3 is a view of a distribution of insulation rods according to the present invention.
Figure 4:
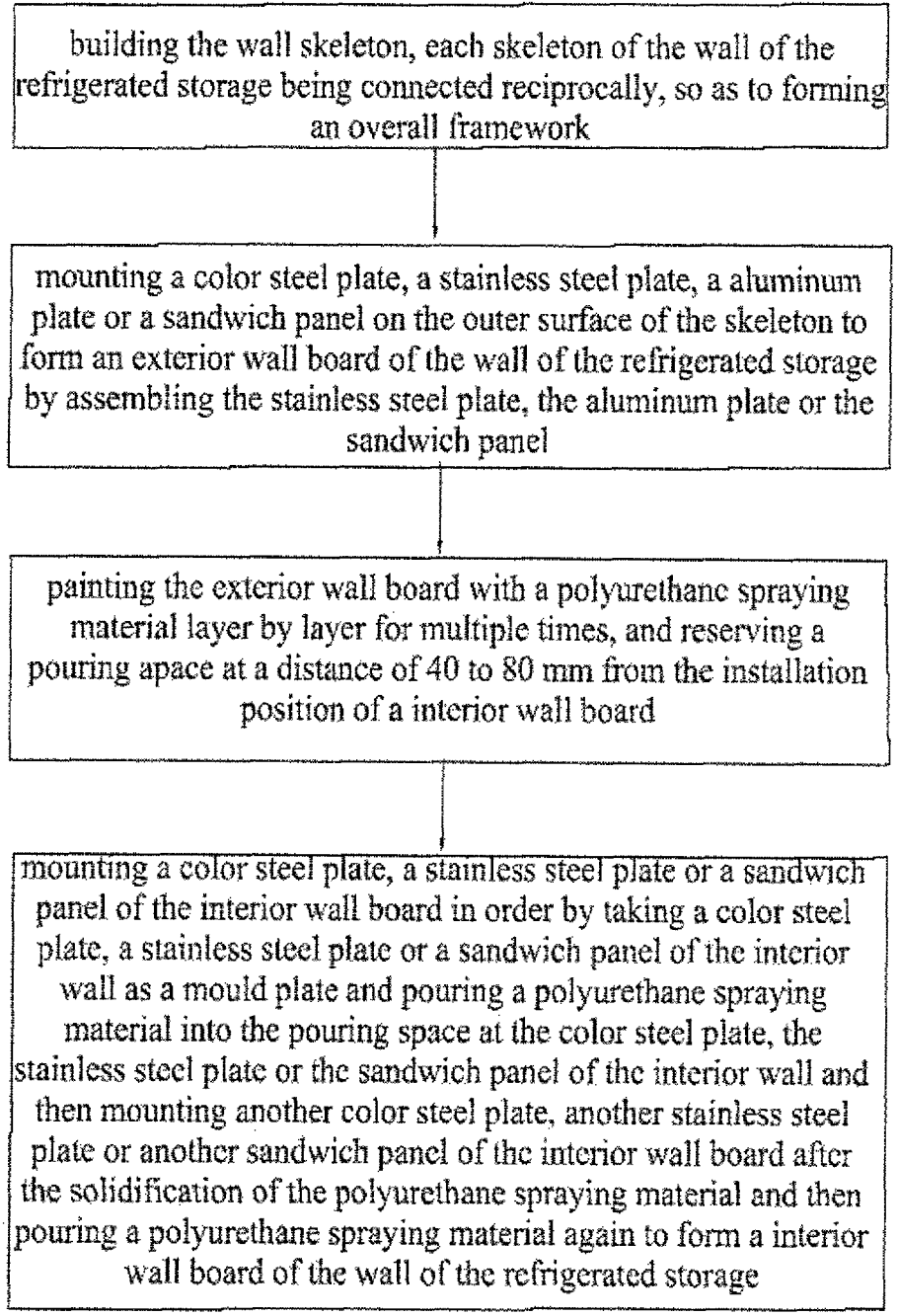
FIG. 4 is a flow chart of method of construction wall according to the present invention.

FIGS. 1-3 illustrate an embodiment of a wall structure of a large-sized refrigerated storage according to the present invention. Referring to FIGS. 1-3, the wall structure of a large-sized refrigerated storage comprises an interior wall color steel plate 1 as an interior wall board, an exterior wall color steel plate 2 as an exterior wall board and a skeleton positioned between the interior wall color steel plate 1 and the exterior wall color steel plate 2. A space formed between the interior wall color steel plate 1 and the exterior wall color steel plate 2 is filled with polyurethane foam plastic 7. The skeleton is constructed by vertical fixed steel columns 6 and lateral fixed angle steels 5. The vertical fixed steel columns 6 of the skeleton are C-shaped steels which situated at the exterior wall board or one side of the high-temperature wall board 2 in line, and the lateral fixed angle steels 5 of the skeleton are situated at the interior wall color steel plate 1 as well as at the exterior wall color steel plate 2 in parallel. In order to fix, the angle steels 5 at the interior wall color steel plate 1 and at the exterior wall color steel plate 2, providing a plurality of broken cold-bridge components each connecting to the angle steels 5 at the interior wall color steel plate 1 and the angle steels 5 at the exterior wall color steel plate 2 which positioned on the same level as the steels 5 at the interior wall color steel plate 1. The addition of the broken cold-bridge components not only establish the whole skeleton structure, but also avoid the cool air in the refrigerated storage escaping. In the embodiment, the interior wall color steel plate 1 and the exterior wall color steel plate 2 are both made up of corrugated color steel plates, with the interior wall color steel plate 1 fixed on the angle steels 5 of the interior wall board and the exterior wall color steel plate 2 fixed on the angle steels 5 of the exterior wall board, and the polyurethane foam plastic 7 in the wall integrated with the interior wall color steel plate 1 and the exterior wall color steel plate 2, thus foam a whole structure.

In the embodiment of the invention, alternatively, in order to strengthen the skeleton structure, the steel columns 6 are applied to on the interior wall color steel plate 1 as well as the exterior wall color steel plate 2. Two square-formed net frames each formed on either surface of the skeleton being contacted to the interior or exterior wall color steel plate 1, 2 is made up of a crossed welding of the C-shaped steels columns 6 of vertical arrangement and the angle steels 5 of lateral arrangement. The two square-formed net frames includes a interior net frame and a exterior net frame, and the angle steels 5 on the interior net frame is level with those on the exterior net frame. What's more, providing a plurality of broken cold-bridge components each connecting to the angle steels 5 at the interior wall color steel plate 1 and the angle steels 5 at the exterior wall color steel plate 2 which positioned on the same level as the steels 5 at the interior wall color steel plate 1 by welding to strengthen the skeleton structure further.

In the embodiment of the invention, the distance between the adjacent steel columns ranges from 2000 mm to 4000 mm as required. In the case of meeting the limitation requirements, alternatively, the distance between the adjacent steel columns is 3000 mm.

Each of the broken cold-bridge components is mainly consist of a solid cylindrical insulation rod 3 being made of high impaction PP and two screws 4. In order to connecting the insulation rod 3 and the screw 4 quickly and conveniently, either end of the insulation rod 3 has a screwhole or a metal wire, and one end of the screw 4 is spinning to the screwhole or the metal wire of the insulation rod 3 when the other end of the screw 4 is connecting to the angle steel 5 by welding. Each of the angle steels 5 in the same level is connecting with a insulation rod 3, and the insulation rods 3 positioned on the same level are perpendicular to the interior wall board 1 and the exterior wall board 2 essentially. According to the practical situation, the distance between the adjacent insulation rods 3 ranges from 500 mm to 1000 mm. In the embodiment of the invention, alternatively, the distance between the adjacent insulation rods 3 is 750 mm.

Referring to FIGS. 1-4, a method of construction wall of a large-sized refrigerated storage comprising the steps of:

A. building the wall skeleton, each skeleton of the wall of the refrigerated storage being connected reciprocally, so as to forming an overall framework;

B. mounting a exterior wall color steel plate 2 on the outer surface of the skeleton to form an exterior wall board of the wall of the refrigerated storage by assembling the exterior wall color steel plate 2 using a sealed type blind rivet with excellent water resistance;

C. painting the exterior wall color steel plate 2 with a polyurethane spraying material layer by layer for multiple times, and reserving a pouring apace at a distance of 40 to 80 mm from the installation position of a interior wall color steel plate 1; and D. mounting the interior wall color steel plates 1 in order by taking a interior wall color steel plate 1 as a mould plate and pouring a polyurethane spraying material into the pouring space at the interior wall color steel plate 1, and then mounting another color steel plate after the solidification of the polyurethane spraying material and then pouring a polyurethane spraying material again to form a interior wall board of the wall of the refrigerated storage. The interior wall board can be a stainless steel plate or a sandwich panel according to different needs.

The step A further comprises the steps of: building the skeleton with C-shaped steel columns and angle steels 5 by providing a line of C-shaped steel columns 6 situated at the exterior wall board or a high-temperature side, the distance between the adjacent steel columns 6 being ranged from 2000 mm to 4000 mm; and providing a plurality of lateral fixed angle steels 5 on the C-shaped steel columns being up, each broken cold-bridge component having one end thereof being soldered to the angle steel 5 situated at the exterior wall color steel plate 2 and the other end thereof being soldered to the angle steel 5 situated at the interior wall color steel plate 1. The distance between the adjacent insulation rods of broken cold-bridge component positioned on the same level is 750 mm.

The spraying method of layer by layer for multiple times in the step C further comprises the steps of:

taking a first layer of the polyurethane spraying material of the interior wall color steel plate 1 with the thickness being 10 mm to 15 mm as a mould plate at the first time of spraying, and then painting a second layer with polyurethane spraying material after the solidification of the first layer of the polyurethane spraying material in 5 minutes;

forming a second layer of the polyurethane spraying material of the interior wall color steel plate 1 with the thickness being 15 mm to 25 mm, and then painting a third layer with polyurethane spraying material after the solidification of the second layer of the polyurethane spraying material in 5 minutes; and forming a third layer of the polyurethane spraying material of the interior wall color steel plate 1 with the thickness being 25 mm to 35 mm, and taking the thickness of the third layer as the model for each spraying after that until producing a distance of 60 mm from the interior wall board.

The 60 mm space reserved to be used in the step D which comprises the steps of: mounting the interior wall color steel plates 1 by a sealed type blind rivet with excellent water resistance and pouring a polyurethane spraying material into the space between the interior wall color steel plate 1 being up and the foam layer of polyurethane spraying material by a pouring method of pouring the plates one after one: fastening a second plate to the first plate which has been pouring, and then pouring the second plate, until the polyurethane spraying material solidified, the interior wall color steel plate 1 and the instruction layer come into a unit that with no gap between the interior wall color steel plate 1 and the foam layer as well as the gaps between the adjacent interior wall color steel plates 1 are enclosing absolutely.

If the wall structure of refrigerated storage is applied in the storage as partition wall, the connection between the wall and the top of refrigerated storage also make thermal break dispose with heat insulation stick. The structure of the invention is simple, the strength of lightweight steel construction is high. The construction technology of the wall of refrigerated storage is quick and efficient, construction cycle only is the half of the one of civil engineering storage, close to combined type refrigerated storage; the out shield color-coated steel sheet plate, corrosion resistant plate or aluminium sheet and insulating layer are adhered to a unity by the flooding method, good performance of separate gas, crashworthiness; foam do not contact with air, the release and loss of foaming agent is slow, endure ageing; adopting thermal break structure dispose with heat insulation stick is safe and reliable, the construction is quick.

What is claimed is:

1. A wall structure of a large-sized refrigerated storage, wherein the wall structure comprises an interior wall board, an exterior wall board and a skeleton positioned between the interior wall board and the exterior wall board, a space formed between the interior wall board and the exterior wall board being filled with a polyurethane foam plastic; the skeleton which being constructed by vertical fixed steel columns and lateral fixed light steels having broken cold-bridge components fixed therein, each of said broken cold-bridge components having two ends being soldered to the light steels on both side of the skeleton respectively.

2. The wall structure of a large-sized refrigerated storage according to claim 1, wherein the vertical fixed steel columns of the skeleton are situated at the exterior wall board or a high-temperature side in line, and the lateral fixed light steels of the skeleton are situated at the interior wall board as well as at the exterior wall board in parallel.

3. The wall structure of a large-sized refrigerated storage according to claim 1, wherein each of said broken cold-bridge components is mainly consist of a solid cylindrical insulation rod being made of high impaction PP (polyethylene propylene as the main component) and two screws, each of said screws having one end thereof connecting to either end of the insulation rod and the other end thereof connecting to the skeleton by welding.

4. The wall structure of a large-sized refrigerated storage according to claim 3, wherein the insulation rods positioned on the same level are perpendicular to the interior wall board and the exterior wall board essentially, and a distance between the adjacent insulation rods ranges from 500 mm to 1000 mm.

5. The wall structure of a large-sized refrigerated storage according to claim 1, wherein the interior wall board is a color steel plate, a stainless steel plate or a sandwich panel and the exterior wall board wall is a color steel plate, a stainless steel plate, a aluminum plate or a sandwich panel; the steel columns are C-shaped steels or channel steel columns and the light steels are angle steels or C-shaped steels, and a distance between the adjacent steel columns ranges from 2000 mm to 4000 mm.

* * * * *

UNITED STATES PATENT AND TRADEMARK OFFICE
CERTIFICATE OF CORRECTION

| | | |
|---|---|---|
| PATENT NO. | : 8,602,251 B2 | Page 1 of 3 |
| APPLICATION NO. | : 13/262242 | |
| DATED | : December 10, 2013 | |
| INVENTOR(S) | : Hong Wang | |

It is certified that error appears in the above-identified patent and that said Letters Patent is hereby corrected as shown below:

On the Title Page, item (57), line 6, "board (1) and he" should read -- board (1) and the --.

On the Title Page, item (57), line 7, "construction a wall" should read -- construction of a wall --.

On the Title Page, item (57), line 13, "a pouring apace at" should read -- a pouring space at --.

On the Title Page, item (57), line 14, "position of a interior" should read -- position of an interior --.

In the Specifications

Column 1, line 29, "and thus cost" should read -- and thus costs --.

Column 1, line 36, "structure e of the third" should read -- structure of the third --.

Column 1, line 37, "to dealt with" should read -- to deal with --.

Column 1, line 39, "the Integration" should read -- the integration --.

Column 1, line 54, "construction wall" should read -- construction of a wall --.

Column 1, line 67, "on both side" should read -- on both sides --.

Column 2, line 6, "components is" should read -- components --.

Column 2, line 7, "consist of" should read -- consists of --.

Column 2, line 21, "steel plate, a" should read -- steel plate, an --.

Column 2, line 27, "or a aluminum" should read -- or an aluminum --.

Column 2, line 32, "is strength" should read -- has strength --.

Column 2, line 34, "increase the age" should read -- increasing the age --.

Column 2, line 35, "construction wall of" should read -- construction of a wall of --.

Column 2, line 39, "forming an" should read -- form an --.

Column 2, line 47, "apace at a" should read -- space at a --.

Column 2, line 48, "a interior wall" should read -- an interior wall --.

Column 2, line 59, "form a interior" should read -- form an interior --.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,602,251 B2

Column 3, line 46, "construction wall of" should read -- construction of a wall of --.

Column 3, line 49, "which resorts to" should read -- which resort to --.

Column 3, line 50, "plate or a" should read -- plate or an --.

Column 3, line 52, "is safe and" should read -- are safe and --.

Column 3, line 58, "steel is strength" should read -- steel has strength --.

Column 3, line 60, "thus prolong the" should read -- thus prolonging the --.

Column 4, line 27, "which situated" should read -- which are situated --.

Column 4, line 31, "order to fix, the" should read -- order to fix the --.

Column 4, line 33, "providing a" should read -- provided are --.

Column 4, lines 36-37, "which positioned" should read -- which are positioned --.

Column 4, line 39, "only establish" should read -- only establishes --.

Column 4, line 40, "also avoid the" should read -- also avoids the --.

Column 4, line 52, "applied to on the" should read -- applied to the --.

Column 4, line 56, "is made up of" should read -- are made up of --.

Column 4, line 59, "includes a interior" should read -- include an interior --.

Column 4, line 60, "net frame is" should read -- net frame are --.

Column 4, line 61, "providing a" should read -- provided are --.

Column 5, line 6, "components is" should read -- components --.

Column 5, line 8, "connecting" should read -- connect --.

Column 5, line 14, "with a" should read -- with an --.

Column 5, line 24, "construction wall" should read -- construction of a wall --.

Column 5, line 27, "forming an" should read -- form an --.

Column 5, line 28, "mounting a" should read -- mounting an --.

Column 5, line 35, "pouring apace" should read -- pouring space --.

Column 5, line 39, "taking a" should read -- taking an --.

Column 5, line 44, "form a interior" should read -- form an interior --.

Column 6, line 28, "of refrigerated" should read -- of the refrigerated --.

Column 6, line 29, "as partition" should read -- as a partition --.

Column 6, line 30, "also make" should read -- also makes a --.

Column 6, line 30-31, "break dispose" should read -- break disposed --.

Column 6, line 31, "with heat" should read -- within the heat --.

Column 6, line 39, "foam do" should read -- foam does --.

Column 6, line 41, "slow, endure" should read -- slow, and endures --.

Column 6, line 41, "adopting thermal" should read -- adopting the thermal --.

Column 6, lines 41-42, "dispose with" should read -- disposed within the --.

In the Claims

Column 6, line 55, "both side" should read -- both sides --.

Column 6, line 65, "components is" should read -- components --.

Column 6, line 65, "consist" should read -- consists --.

Column 7, line 13, "plate, a" should read -- plate, an --.